(12) United States Patent
Maruki et al.

(10) Patent No.: US 7,795,171 B2
(45) Date of Patent: Sep. 14, 2010

(54) CERIUM-ZIRCONIUM BASED COMPOUND OXIDE AND PRODUCTION METHOD THEREOF

(75) Inventors: Masatoshi Maruki, Osaka (JP); Hiroshi Okamoto, Osaka (JP); Hiroshi Kodama, Osaka (JP); Akiko Izumi, Osaka (JP)

(73) Assignee: Daiichi Kigenso Kagaku Kogyo Co., Ltd., Osaka-shi (JP)

( * ) Notice: Subject to any disclaimer, the term of this patent is extended or adjusted under 35 U.S.C. 154(b) by 0 days.

(21) Appl. No.: 12/414,028

(22) Filed: Mar. 30, 2009

(65) Prior Publication Data

US 2009/0258781 A1 Oct. 15, 2009

(30) Foreign Application Priority Data

Apr. 9, 2008 (JP) .............................. 2008-125276

(51) Int. Cl.
*B01J 23/10* (2006.01)
(52) U.S. Cl. ....................................... 502/304; 502/300
(58) Field of Classification Search ................. 502/304, 502/300
See application file for complete search history.

(56) References Cited

U.S. PATENT DOCUMENTS

| 5,747,401 | A | * | 5/1998 | Cuif | ............................ | 501/103 |
| 5,908,800 | A |  | 6/1999 | Bonneau et al. | | |
| 6,133,194 | A |  | 10/2000 | Cuif et al. | | |
| 2003/0224931 | A1 |  | 12/2003 | Yamamoto et al. | | |
| 2006/0018822 | A1 |  | 1/2006 | Okamoto | | |
| 2006/0189480 | A1 | * | 8/2006 | Takeshima | .................. | 502/304 |
| 2008/0050593 | A1 |  | 2/2008 | Okamoto | | |

FOREIGN PATENT DOCUMENTS

| EP | 1621251 A1 | 2/2006 |
| EP | 1803686 A1 | 7/2007 |
| EP | 1894620 A1 | 3/2008 |
| JP | 3016865 B2 | 3/2000 |
| JP | 2001-524918 A | 4/2001 |
| JP | 2006-036576 A | 2/2006 |
| JP | 2008-081392 A | 4/2008 |
| WO | 95/18068 A1 | 7/1995 |
| WO | 98/45212 A1 | 10/1998 |

OTHER PUBLICATIONS

European Search Report dated Aug. 4, 2009, issued in corresponding European Patent Application No. 09157477.2.

* cited by examiner

*Primary Examiner*—Timothy C Vanoy
*Assistant Examiner*—Michelle Hou
(74) *Attorney, Agent, or Firm*—Westerman, Hattori, Daniels & Adrian, LLP

(57) ABSTRACT

The present invention provides a cerium-zirconium based compound oxide having a total pore volume of at least 0.4 ml/g, the volume of pores having a diameter of 10 nm to 100 nm of 0.25 ml/g or more, and the volume of pores having a diameter of 100 nm to 10 μm of 0.2 ml/g or less. The cerium-zirconium based compound oxide preferably has excellent thermal stability, which allows the desirable pore volume to be maintained even after conducting a further heat treatment at 1,000° C. for 3 hours.

6 Claims, 4 Drawing Sheets

CERIUM-ZIRCONIUM BASED COMPOUND OXIDE AND PRODUCTION METHOD THEREOF

TECHNICAL FIELD

The present invention relates to a cerium-zirconium based compound oxide and a method for producing the same.

BACKGROUND ART

The specific surface area of zirconia alone used as a catalyst carrier is only about 100 m²/g at 400° C. Zirconia alone having a specific surface area greater than 100 m²/g is generally amorphous that does not have a stable structure. Therefore, when zirconia alone is used as a catalyst carrier, its specific surface area reduces in size at a temperature higher than 400° C. This makes it difficult to obtain stable catalytic performance at a high temperature. In order to satisfactorily function as a catalyst carrier, a higher heat resistance (thermal stability) is required.

In contrast, a zirconia-ceria composition consisting of a zirconium oxide and a cerium oxide generally maintains a relatively large specific surface area even at a high temperature of 1,000° C. Because of this property, a zirconia-ceria composition is more advantageous than zirconia alone in terms of thermal stability, when used as a catalyst.

However, not only the thermal stability so as to maintain a certain specific surface area but also the pore volume distribution, thermal stability of the pores, etc., have recently become increasingly important. This is because when a carrier supports an active precious metal, the zirconia particles form agglomerations and the number of pores, in particular those having a diameter of 100 nm or more, is reduced when heat-treated, and the particles of platinum, rhodium, palladium and like precious metals supported on the surface of the carrier may be embedded in an inside of zirconia particles, decreasing their ability to effectively contribute to the reaction occurring on the surface.

Specifically, precious metals, which are active species of catalysts, can be supported with sufficient dispersibility in pores having a diameter of 10 to 100 nm. Therefore, it is preferable that the volume of pores having a diameter of 10 to 100 nm be as large as possible, and that of the volume of pores having a diameter of 100 nm or more be as small as possible. It is more preferable that the pores having a diameter of 10 to 100 nm have sufficient thermal stability against temperatures as high as 1,000° C. or more, so that the large volume of pores having a diameter of 10 to 100 nm can be maintained after the heat treatment.

Patent Document 1 discloses cerium oxide, zirconium oxide, $(Ce,Zr)O_2$ compound oxide, and solid solution $(Ce,Zr)O_2$ having about 0.8 ml/g or more pore volume after calcining at about 500° C. in air for 2 hours.

Patent Document 2 discloses mixed cerium and zirconium oxide having at least 0.6 cm³/g of total pore volume, wherein at least 50% of the total pores have a diameter of 10 to 100 nm. Examples of D2 disclose compound oxides having about 0.8 cm³/g of pore volume after baking at 800° C. for 6 hours.

However, taking into consideration that automobile catalysts are actually used under temperatures not less than 1,000° C., the compound oxides disclosed in Patent Documents 1 and 2 do not have satisfactory high temperature thermal stability.

Patent Document 3 discloses a zirconia-based porous material having a pore diameter peak at 20 to 110 nm in the pore distribution measured by the BJH method, wherein the total pore volume is 0.4 cc/g or more, and the total volume of pores having a diameter of 10 to 100 nm is 50% or more of total pore volume.

Patent Document 4 discloses porous zirconia-based powder having a total pore volume of at least 0.75 ml/g after a heat treatment at 1,000° C. for 3 hours, and the total volume of pores having a diameter of 10 to 100 nm after the heat treatment at 1,000° C. for 3 hours is at least 30% of total pore volume. Patent Document 4 also discloses a method for producing porous zirconia-based powder comprising the steps of "adding a sulfatizing agent to a zirconium salt solution to produce a basic zirconium sulfate; neutralizing the basic zirconium sulfate to produce a zirconium hydroxide; and heat-treating the zirconium hydroxide to produce a porous zirconia-based powder, wherein the sulfatizing agent is added to the zirconium salt solution having a temperature 100° C. or more in an autoclave". However, in Patent Documents 3 and 4, since the volume of pores having a diameter of 100 nm or more is as large as 0.3 ml/g, further improvement is required.

Patent Document 1
  Japanese Unexamined Patent Publication No. 2001-524918

Patent Document 2
  Japanese Patent No. 3016865

Patent Document 3
  Japanese Unexamined Patent Publication No. 2006-36576

Patent Document 4
  Japanese Unexamined Patent Publication No. 2008-081392

DISCLOSURE OF THE INVENTION

Problem to be Solved by the Invention

The present invention has been accomplished in view of the above-mentioned problems. An object of the present invention is to provide a cerium-zirconium based compound oxide having a large total pore volume, a large volume of pores having a diameter of 10 to 100 nm, and a small volume of pores having a diameter of 100 nm or more. The cerium-zirconium based compound oxide preferably has excellent thermal stability, which allows the desirable pore volume to be maintained even after conducting a further heat treatment at 1,000° C. for 3 hours. Another object of the present invention is to provide a simple method for producing the cerium-zirconium based compound oxide.

Means for Solving the Problem

The present inventors conducted extensive study to achieve the above object. As a result, the present inventors found a method by which the formation of pores having a diameter of 100 nm or more is suppressed, and the production of pores having a diameter of 10 to 100 nm with excellent thermal stability is promoted. Specifically, in the production method of Patent Document 4, an oxidizing agent is added to the cerium salt solution to transform a part of trivalent cerium salt into tetravalent, a basic zirconium sulfate is added thereto, and then the mixture is subjected to neutralization and heat treatment.

Based on this finding, the present invention provides:

Item 1. A cerium-zirconium based compound oxide having a total pore volume of at least 0.4 ml/g, the volume of pores having a diameter of 10 nm to 100 nm being 0.25 ml/g or more, and the volume of pores having a diameter of 100 nm to 10 μm being 0.2 ml/g or less.

Item 2. The cerium-zirconium based compound oxide according to Item 1, wherein, after a heat treatment at 1,000° C. for 3 hours, the total pore volume is at least 0.35 ml/g, the volume of pores having a diameter of 10 nm to 100 nm is 0.2 ml/g or more, and the volume of pores having a diameter of 100 nm to 10 μm is 0.2 ml/g or less.

Item 3. The cerium-zirconium based compound oxide according to Item 1 or 2, wherein the atomic ratio of cerium to zirconium is 20:80 to 80:20.

Item 4. The cerium-zirconium based compound oxide according to any one of Items 1 to 3, which contains 1% to 30% of oxide of at least one metal selected from the group consisting of rare-earth metals other than cerium, transition metal elements, alkaline earth metals, Al, In, Si, Sn, Bi and Zn.

Item 5. A method for producing a cerium-zirconium based compound oxide comprising:

Step 1: adding an oxidizing agent to a cerium salt solution;

Step 2: adding a sulfatizing agent to a zirconium salt solution of 100° C. or more in an autoclave to form a basic zirconium sulfate;

Step 3: mixing an oxidizing agent-added cerium salt solution with a basic zirconium sulfate;

Step 4: neutralizing the mixed solution to form a cerium-zirconium based compound hydroxide; and Step 5: heat-treating the cerium-zirconium based compound hydroxide to form a cerium-zirconium based compound oxide.

Item 6. The method for producing a cerium-zirconium based compound oxide according to Item 5, wherein at least one metal salt selected from the group consisting of salts of rare-earth metals other than cerium, transition metal elements, alkaline earth metals, and salts of Al, In, Si, Sn, Bi and Zn is added before neutralizing the mixed solution of the oxidizing agent-added cerium salt solution and the basic zirconium sulfate.

Effect of the Invention

The present invention provides a cerium-zirconium based compound oxide having a total pore volume of at least 0.4 ml/g, the volume of pores having a diameter of 10 to 100 nm is 0.25 ml/g or more, and the volume of pores having a diameter of 100 nm or more is 0.2 ml/g or less. The present invention provides a cerium-zirconium based compound oxide preferably having excellent thermal stability so as to maintain a large volume of pore even after an additional heat treatment at 1,000° C. for 3 hours, and a method for readily producing such a cerium-zirconium based compound oxide. The cerium-zirconium based compound oxide of the present invention can efficiently support platinum, rhodium, palladium, and like precious metals, and is therefore preferably used as a promoter for a ternary catalyst or a catalyst carrier for automobiles.

BEST MODE FOR CARRYING OUT THE INVENTION

The cerium-zirconium based compound oxide of the present invention and its production method are explained in detail below.

The zirconia referred to in the present invention is a typical zirconia containing no more than 10% by weight of impurity metal oxides, including hafnia.

In the present invention, "%" indicates "weight %=mass %", unless otherwise particularly defined.

1. Cerium-Zirconium Based Compound Oxide

The main characteristics of the cerium-zirconium based compound oxide of the present invention are as below.

The cerium-zirconium based compound oxide of the present invention has a total pore volume of at least 0.4 ml/g, the volume of pores having a diameter of 10 to 100 nm is 0.25 ml/g or more, and the volume of pores having a diameter of 100 nm to 10 μm is 0.2 ml/g or less.

It is preferable that, after a heat treatment at 1,000° C. for 3 hours, the total pore volume be at least 0.35 ml/g and preferably 0.4 ml/g or more, the volume of pores having a diameter of 10 nm to 100 nm be 0.2 ml/g or more and preferably 0.25 ml/g or more, and the volume of pores having a diameter of 100 nm to 10 μm be 0.2 ml/g or less.

If total pore volume is less than 0.4 ml/g, it is impossible to support a precious metal with excellent dispersibility.

If the volume of pores having a diameter of 10 nm to 100 nm is less than 0.25 ml/g, the precious metal cannot be supported with excellent dispersibility.

If the volume of pores having a diameter of 100 nm or more exceeds 0.2 ml/g, a large portion of the supported precious metal may be embedded due to pore deformation caused by the heat treatment.

In contrast, if the total pore volume after a heat treatment at 1,000° C. for 3 hours is less than 0.35 ml/g, the high dispersibility of the supported precious metal cannot be maintained.

If the volume of pores having a diameter of 10 to 100 nm after a heat treatment at 1,000° C. for 3 hours is less than 0.2 ml/g, the high dispersibility of the supported precious metal cannot be maintained.

If the volume of pores having a diameter of 100 nm or more after a heat treatment at 1,000° C. for 3 hours exceeds 0.2 ml/g, a large portion of the supported precious metal may be embedded due to the deformation of the pores caused by the heat treatment.

In the cerium-zirconium based compound oxide of the present invention, the atomic ratio of cerium to zirconium is 20:80 to 80:20, and preferably 40:60 to 60:40.

If the atomic ratio of cerium is less than 20, the cerium amount is insufficient for pore control, and the volume of pore having a diameter of 100 nm or more increases.

If the atomic ratio of the cerium exceeds 80, the cerium amount for pore control becomes excessive, and the volume of pores having a diameter of 100 nm or more as well as those having a diameter of 10 nm to 100 nm decreases.

The cerium-zirconium based compound oxide of the present invention contains 1% to 30% and preferably 5% to 20% of oxide of at least one metal selected from the group consisting of rare earth metals (excluding cerium), transition metal elements, alkaline earth metals, Al, In, Si, Sn, Bi and Zn.

Examples of rare earth elements include La, Pr, Nd and like lanthanoid elements, and Y and Sc. Among those, La, Pr, Nd, and Y are preferable.

Examples of transition metal elements include Ti, Cr, Mn, Fe, Co, Ni, Cu, Mo, W, etc. Examples of alkaline earth metals include Mg, Ca, Sr, Ba, etc.

Among those metals, rare earth elements are preferable because they can form stable compound oxides with a zirconium oxide.

If the content thereof is less than 1%, the thermal stability improvement effect cannot be recognized. If the content exceeds 30%, the OSC (Oxygen Storage Capacity), necessary for functioning as a promoter is lowered.

2. Method for Producing Cerium-Zirconium Based Compound Oxide

The method for producing cerium-zirconium based compound oxide of the present invention comprises the steps of:

Step 1: adding an oxidizing agent to a cerium salt solution;

Step 2: adding a sulfatizing agent to a zirconium salt solution of 100° C. or more in an autoclave to form a basic zirconium sulfate;

Step 3: mixing an oxidizing agent-added cerium salt solution with a basic zirconium sulfate;

Step 4: neutralizing the mixed solution to form a cerium-zirconium based compound hydroxide; and Step 5: heat-treating the cerium-zirconium based compound hydroxide to form a cerium-zirconium based compound oxide.

These steps are explained in detail below.

Step 1

In Step 1, an oxidizing agent is added to a cerium salt solution.

There is no limitation to the cerium salts used in the present invention, as long as they are water-soluble trivalent cerium salts. Examples of the usable cerium salts include nitrates, acetates, chlorides, etc. These salts may be used singly or in combination. Taking the residual impurities into consideration, nitrates are preferable.

The type of the solvent may be selected depending on the kinds of cerium salt, etc. Among various solvents, water (for example, purified water and ion-exchanged water; this is also applicable to the description below) is generally most desirable.

There is no limitation to the concentration of cerium salt solution; however, when calculated as the amount of cerium oxide ($CeO_2$), generally 5 g to 250 g, and preferably 20 g to 150 g of cerium oxide ($CeO_2$), are contained per 1,000 g solvent.

Examples of the oxidizing agent used in the present invention include hydrogen peroxide, perchloric acid, persulfuric acid, and salts thereof. Taking post-treatment residual impurities into consideration, hydrogen peroxide is preferable.

The amount of the oxidizing agent added is generally 0.05 to 2 mol, preferably 0.07 to 1 mol, particularly preferably 0.1 to 0.5 mol per 1 mol of Ce.

If the oxidizing agent content is less than 0.05 mol per 1 mol of Ce, sufficient effects cannot be achieved. If the content thereof exceeds 2 mol per 1 mol of Ce, the valence balance of Ce is adversely affected and a highly pure cerium-zirconium compound oxide cannot be obtained.

If hydrogen peroxide is used as an oxidizing agent, trivalent cerium and hydrogen peroxide will not stoichiometrically react to form a tetravalent cerium. From experiments, it was found that trivalent cerium and hydrogen peroxide, when reacted, have the relationship shown in Table 1. Therefore, attention must be given to the properties of the oxidizing agent used.

The reaction formula is believed as below.

$$2Ce^{3+}+2H^{+}+H_2O_2=2Ce^{4+}+2H_2O$$

TABLE 1

| | The amount of hydrogen peroxide added*[1] ($mol$*[2]) | | | | |
|---|---|---|---|---|---|
| | 0.1 | 0.2 | 0.5 | 1.0 | 2.0 |
| Trivalent cerium oxidation rate*[3] (%) | 18 | 39 | 51 | 58 | 64 |

*[1]concentration 35%
*[2]mol amount per trivalent cerium
*[3]the values calculated based on the analysis results of cerium oxide powder after the addition of hydrogen peroxide, neutralization, and baking of hydroxide As described above, oxidizing a portion of the trivalent cerium to the tetravalent cerium is one of the main features of the present invention. This achieves the production of a cerium-zirconium based compound oxide with excellent thermal stability, wherein the formation of pores having a diameter exceeding 100 nm is diminished, and the formation of pores having a diameter of 10 to 100 nm is promoted.

It is clear that the tetravalent cerium salt may be added without the addition of any oxidizing agent. Therefore, such an embodiment is included in the scope of the present invention.

The reason such effects are achieved is unclear; however, it is assumed that by oxidizing a portion of the trivalent Ce ions to the tetravalent Ce ions to make the ion radius of Ce similar to that of Zr, the homogeneity of elements is increased. Furthermore, the affinity of Ce ions and Zr precursor can be improved by the peroxidation of a portion of tetravalent cerium; therefore the solid solubility during the heat treatment to obtain the compound oxide is enhanced, so that the formation of pores having a diameter exceeding 100 nm may be decreased.

Step 2

In Step 2, a sulfatizing agent is added to a zirconium salt solution of 100° C. or more in an autoclave to form a basic zirconium sulfate.

There is no limitation to the zirconium salts used in the present invention, as long as they can supply zirconium ion. Examples of such zirconium salts include zirconium oxynitrate, zirconium oxychloride, zirconium nitrate, etc. These zirconium salts may be used singly or in combination. Among these zirconium salts, zirconium oxychloride is preferable from the standpoint of productivity on a technical scale.

The solvent may be suitably selected depending on the type of zirconium salt used, etc. Among various solvents, water (for example, purified water and ion-exchanged water; this is also applicable in the description below) is generally most desirable.

There is no limitation to the concentration of the zirconium salt solution; however, when calculated as the amount of zirconium oxide ($ZrO_2$), generally 5 g to 250 g, preferably 20 g to 150 g of zirconium oxide ($ZrO_2$), are contained per 1,000 g of solvent.

There is no limitation to the sulfatizing agents, as long as they can form a sulfate by reacting with zirconium ion (in other words, as long as they can vitriolize the zirconium); and sodium sulfate, potassium sulfate, ammonium sulfate, etc., may be used. The sulfatizing agent may be any form, such as powder, solution, etc. The sulfatizing agent is preferably used in the form of a solution (in particular, an aqueous solution). When the sulfatizing agent is used in a form of solution, its concentration may be suitably selected.

It is preferable that the sulfatizing agent be added in such a manner that the weight ratio of a sulfate radical ($SO_4^{2-}$)/$ZrO_2$ be 0.3 to 0.6, the free acid concentration of the mixed solution be 0.2 to 2.2 N (unit: normal). Examples of free acids include sulfuric acid, nitric acid, hydrochloric acid, etc. There is no limitation to the free acids contained, but hydrochloric acid is preferable because of its excellent industrial scale-productivity.

A zirconium salt is then reacted with the sulfatizing agent to form a basic zirconium sulfate.

There is no limitation to the basic zirconium sulfate. Examples of usable basic zirconium sulfates include $ZrOSO_4.ZrO_2$, $5ZrO_2.3SO_3$, $7ZrO_2.3SO_3$ and like compound hydrates; they may be used singly or in combination.

A zirconium salt generally reacts with a sulfatizing agent at a temperature not less than 65° C.; a basic zirconium sulfate is formed as the result of the reaction.

One of main features of the present invention is that a basic zirconium sulfate is formed by adding a sulfatizing agent to a zirconium salt solution of 100° C. or more in an autoclave, preferably 110 to 150° C.

The pressure is generally $1.02\times10^5$ Pa or more, and preferably from $1.45\times10^5$ Pa to $4.91\times10^5$ Pa.

If the temperature is less than 100° C., the sulfatization reaction is slow, resulting in the formation of large agglomerated particles.

Although generally not particularly required, it is preferable that the resulting basic zirconium sulfate be allowed to stand in an autoclave for about 10 to 60 minutes after the completion of the sulfatization reaction, so that the basic zirconium can be aged.

Thereafter, basic zirconium sulfate-containing slurry is removed from the autoclave and cooled to a temperature of 80° C. or less, preferably 60° C. or less.

Step 3

In Step 3, an oxidizing agent-added cerium salt solution is mixed with basic zirconium sulfate.

There is no limitation to the mixing method; however, an oxidizing agent-added cerium salt solution is generally added to basic zirconium sulfate-containing slurry.

The cerium-zirconium compound oxide of the present invention contains generally 1% to 30% and preferably 5% to 20% of oxide of at least one metal selected from the group consisting of rare earth metals (excluding cerium), transition metal elements, alkaline earth metals, Al, In, Si, Sn, Bi and Zn.

This can be achieved by adding a specific amount of salt of at least one metal selected from the group consisting of rare earth metals (excluding cerium), transition metal elements, alkaline earth metals, Al, In, Si, Sn, Bi and Zn, before neutralizing the mixed solution in Step 3.

Step 4

In Step 4, the mixed solution obtained in Step 3 is neutralized using an alkali to form a cerium-zirconium based compound hydroxide.

There is no limitation to the usable alkalis; for example, ammonium hydroxide, ammonium bicarbonate, sodium hydroxide, potassium hydroxide and the like may be used.

Among these, sodium hydroxide is preferable, because it can be industrially produced at a low cost.

There is no limitation to the concentration of alkali used; however, it is generally 20% to 30%.

There is no limitation to the total amount of alkali added, as long as a precipitate can be formed from the solution. However the alkali is generally added in such a manner that the pH of the solution becomes 11 or more, preferably 12 or more.

After the completion of the neutralizing reaction, it is preferable that the cerium-zirconium based compound hydroxide-containing solution be maintained at a temperature of 35° C. to 60° C. for more than 1 hour. This ages the resulting precipitate, making filtration easier.

The resulting cerium-zirconium based compound hydroxide is collected by a solid-liquid-separation method. The solid-liquid-separation method may be conducted by a known method such as filtration, centrifugal separation, decantation, etc.

After the collection, the cerium-zirconium based compound hydroxide is preferably washed or the like as necessary to remove adhered impurities.

The resulting cerium-zirconium based compound hydroxide may be dried, if necessary. Drying may be conducted by known methods such as air drying, or drying by heating. If necessary, a grinding treatment, classifying processing, etc., may be conducted after drying.

Step 5

In Step 5, the cerium-zirconium based compound hydroxide is subjected to a heat treatment to form a cerium-zirconium based compound oxide.

There is no limitation to the heat treatment temperature; however, the heat treatment is generally conducted at about 400° C. to 900° C., for 1 to 5 hours. There is also no limitation to the heat treatment atmosphere; however, the heat treatment is generally conducted in the air or an oxidizing atmosphere.

The thus-obtained compound oxide may be ground, if necessary. There is no limitation to the grinding method; for example, grinding may be conducted using a planetary mill, ball mill, jet mill or like grinder.

EXAMPLES

The present invention is explained in detail below with reference to Examples. However, the scope of the present invention is not limited to these Examples.

Each physical property in the Examples was measured by the following procedures.

(1) Specific Surface Area

Specific surface area was measured according to the BET method using a specific surface area measuring instrument (Flowsorb II, product of Micromeritics Corp.).

(2) Total Pore Volume

1. Fresh: an oxide obtained by subjecting a hydroxide to a heat treatment at 600° C. for 5 hours; and 2. At 1,000° C. after 3 hours: powder obtained by subjecting the oxide obtained in Item 1 above to an additional heat treatment at 1,000° C. for 3 hours;

was cooled to room temperatures and the total pore volume was measured by a mercury porosimetry method using pore distribution measurement equipment (Pore Master 60-GT). Measurement range: 0.0036 μm to 10.3 μm.

Example 1

To 400 g of trivalent cerium nitrate solution (concentration calculated as $CeO_2$: 10%), 8 g of 35% hydrogen peroxide solution was added to obtain a cerium solution.

The content of tetravalent cerium per total cerium was 21% (the value calculated based on the analysis results of cerium oxide powder after the addition of hydrogen peroxide, neutralization, and baking the hydroxide).

Thereafter, 130 g (50 g calculated as $ZrO_2$) of zirconium oxychloride octahydrate was dissolved in ion-exchanged water, and 35% hydrochloric acid and ion-exchanged water were added in such a manner that its acidic concentration became 0.67 N, and the $ZrO_2$ concentration became 4 w/v %. The resulting solution was heated to $2\times10^5$ Pa and 120° C. When the temperature reached 120° C., 740 g of 5% sodium sulfate was added thereto; the solution was maintained at that temperature for 15 minutes, after which it was left to stand until reaching room temperature. Thus, basic zirconium sulfate slurry was obtained.

Thereafter, the above-obtained cerium solution and 100 g of a lanthanum nitrate (concentration calculated as $La_2O_3$: 10%) solution were added to the basic zirconium sulfate slurry, followed by the addition of 500 g of 25% sodium hydroxide. Next, decantation was repeated until the impurities were removed. Thereafter, the resulting slurry was subjected to filtration and washed to form hydroxide. The hydroxide was subjected to baking at 600° C. for 5 hours to obtain an oxide.

The oxide was ground in a mortar until the particle diameter became less than 20 μm.

Table 2 shows the measurement results of the specific surface areas and total pore volumes, etc.

FIG. 1 shows the Fresh (fired at 600° C. for 5 hours), and FIG. 2 shows the total pore volumes of the Fresh further subjected to a heat treatment at 1,000° C. for 3 hours.

Example 2

To 600 g of trivalent cerium nitrate solution (concentration calculated as $CeO_2$: 10%), 12 g of 35% hydrogen peroxide solution was added to obtain a cerium solution.

The tetravalent cerium content per total cerium was 24% (the value calculated based on the analysis results of cerium oxide powder after the addition of hydrogen peroxide, neutralization, and baking the hydroxide).

To 600 g of the basic zirconium sulfate slurry (concentration calculated as $ZrO_2$: 5%) obtained in Example 1 were added the above-obtained cerium solution and 100 g of a lanthanum nitrate solution (concentration calculated as $La_2O_3$: 10%), followed by the addition of 500 g of 25% sodium hydroxide. Next, decantation was repeated until the impurities were removed. Thereafter, the resulting slurry was subjected to filtration and washed to form hydroxide. The hydroxide was subjected to baking at 600° C. for 5 hours to obtain an oxide. The resulting oxide was ground in a mortar until the particle diameter became less than 20 μm.

Table 2 shows the measurement results of the specific surface areas and total pore volumes, etc.

Comparative Example 1

A compound oxide was obtained in the same manner as in Example 1, except that a hydrogen peroxide solution was not added to cerium nitrate.

Table 2 shows the measurement results of the specific surface areas and total pore volumes, etc.

FIG. 3 shows the Fresh (baked at 600° C. for 5 hours), and FIG. 4 shows the total pore volumes of the Fresh further subjected to a heat treatment at 1,000° C. for 3 hours.

TABLE 2

|  | Example 1 | Example 2 | Comparative Example 1 |
|---|---|---|---|
| $ZrO_2$, wt % | 50 | 30 | 50 |
| $CeO_2$, wt % | 40 | 60 | 40 |
| $La_2O_3$, wt % | 10 | 10 | 10 |
| SA (Fresh), m²/g | 65 | 75 | 75 |
| Aged SA*1, m²/g | 42 | 26 | 48 |
| Fresh | | | |
| Total pore volume, ml/g | 0.62 | 0.45 | 0.99 |
| Total volume of pores having a diameter of 10 to 100 nm (ml/g) | 0.44 | 0.29 | 0.52 |
| Total volume of pores having a diameter of 100 nm to 10 μm (ml/g) | 0.18 | 0.16 | 0.47 |
| After the heat treatment at 1,000° C. × 3 hours | | | |
| Total pore volume (ml/g) | 0.54 | 0.40 | 0.80 |
| Total volume of pores having a diameter of 10 to 100 nm (ml/g) | 0.37 | 0.26 | 0.47 |
| Total volume of pores having a diameter of 100 nm to 10 μm (ml/g) | 0.17 | 0.14 | 0.33 |

*1After the heat treatment at 1,000° C. for 3 hours

As is clear from Table 2, the cerium-zirconium based compound oxides obtained in Example 1 and Example 2 have a total pore volume of at least 0.4 ml/g, the volume of pores having a diameter of 10 nm to 100 nm of 0.25 ml/g or more, the volume of pores having a diameter of 100 nm to 10 μm of 0.2 ml/g or less. The cerium-zirconium based compound oxides also have, after a heat treatment at 1,000° C. for 3 hours, the total pore volume of at least 0.35 ml/g, the volume of pores having a diameter of 10 nm to 100 nm of 0.2 ml/g or more, and the volume of pores having a diameter of 100 nm to 10 μm of 0.2 ml/g or less. In other words, the cerium-zirconium based compound oxides obtained in Example 1 and Example 2 meet the essential requirements of the present invention. The pore volumes of "Fresh" and "After a heat treatment at 1,000° C. for 3 hours" were compared. The results indicate that the reduction of pore volume is small even after the heat treatment at 1,000° C. for 3 hours, i.e., having a high thermal stability enough to maintain the pore volume.

In contrast, the cerium-zirconium based compound oxide obtained in Comparative Example 1 has a large total pore volume of 0.8 ml/g to 0.99 ml/g both in "Fresh" and "After a heat treatment at 1,000° C. for 3 hours"; however, it has a very large volume, i.e., 0.33 ml/g to 0.47 ml/g, of pores having a diameter of 100 nm to 10 μm. When a cerium-zirconium based compound oxide having such properties supports platinum, rhodium, palladium and like precious metals, it cannot fully utilize the catalytic abilities of the precious metals. Therefore, in order to obtain the same catalytic ability as the present invention, a large amount of platinum, rhodium, palladium or like precious metal is necessary, and is therefore inefficient.

Figure 1:
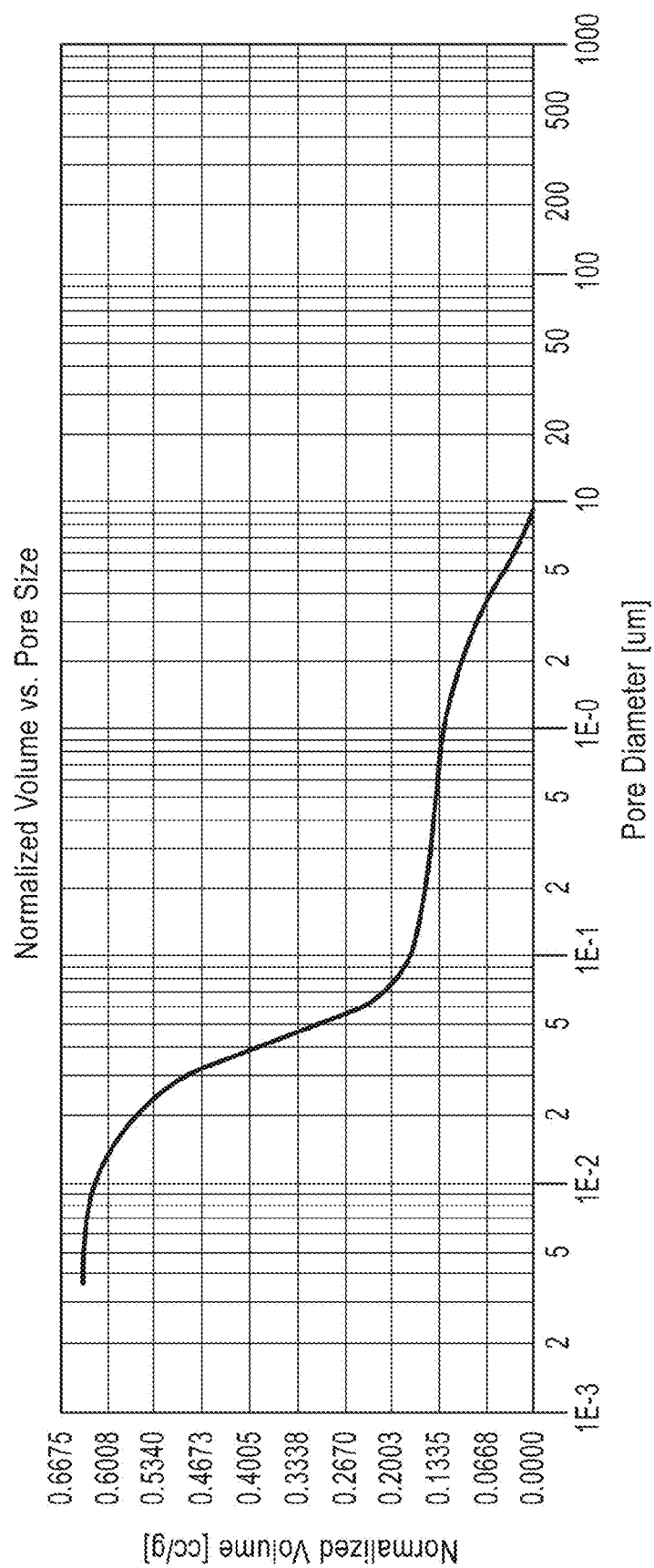
FIG. 1 shows the measurement results of the total pore volume of the cerium-zirconium based compound oxide obtained in Example 1 (Fresh) of the present invention.
Figure 2:
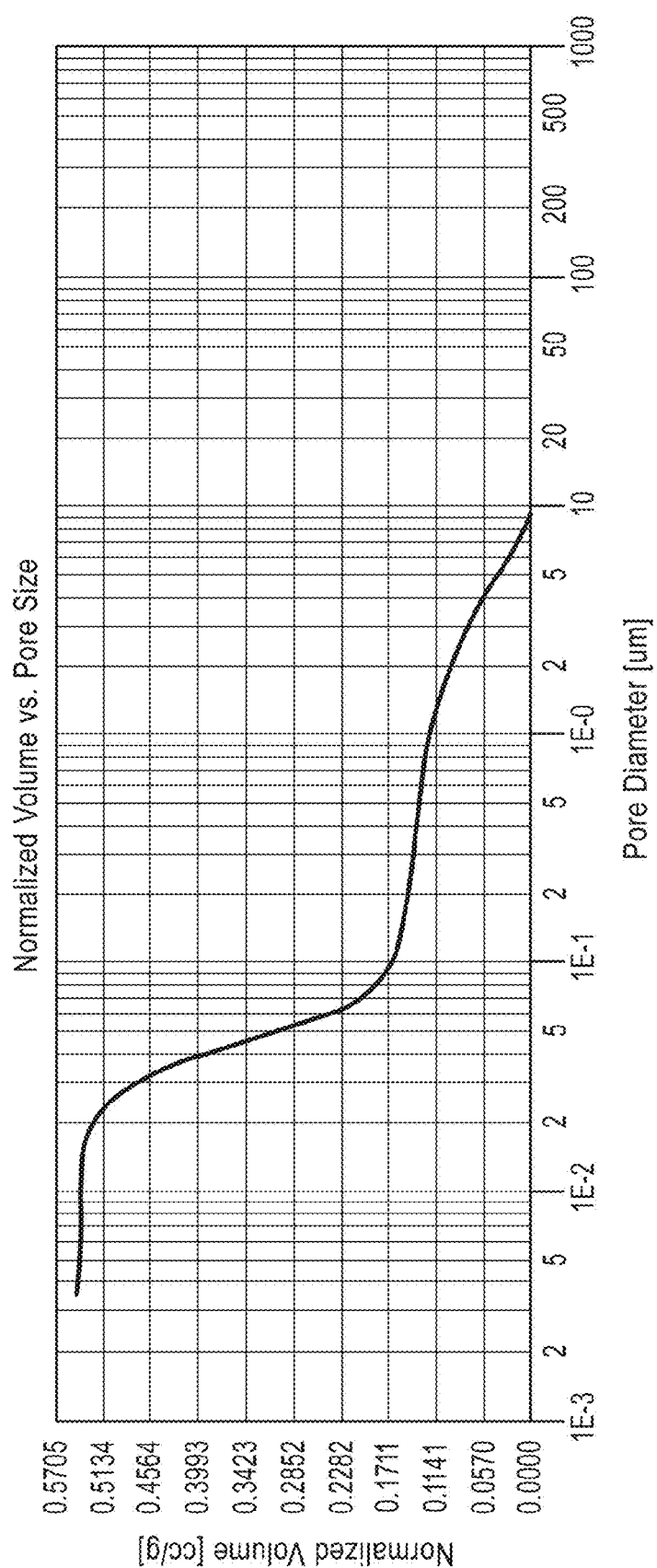
FIG. 2 shows the measurement results of the total pore volume of the cerium-zirconium based compound oxide obtained in Example 1 (after a heat treatment at 1,000° C. for 3 hours) of the present invention.
Figure 3:
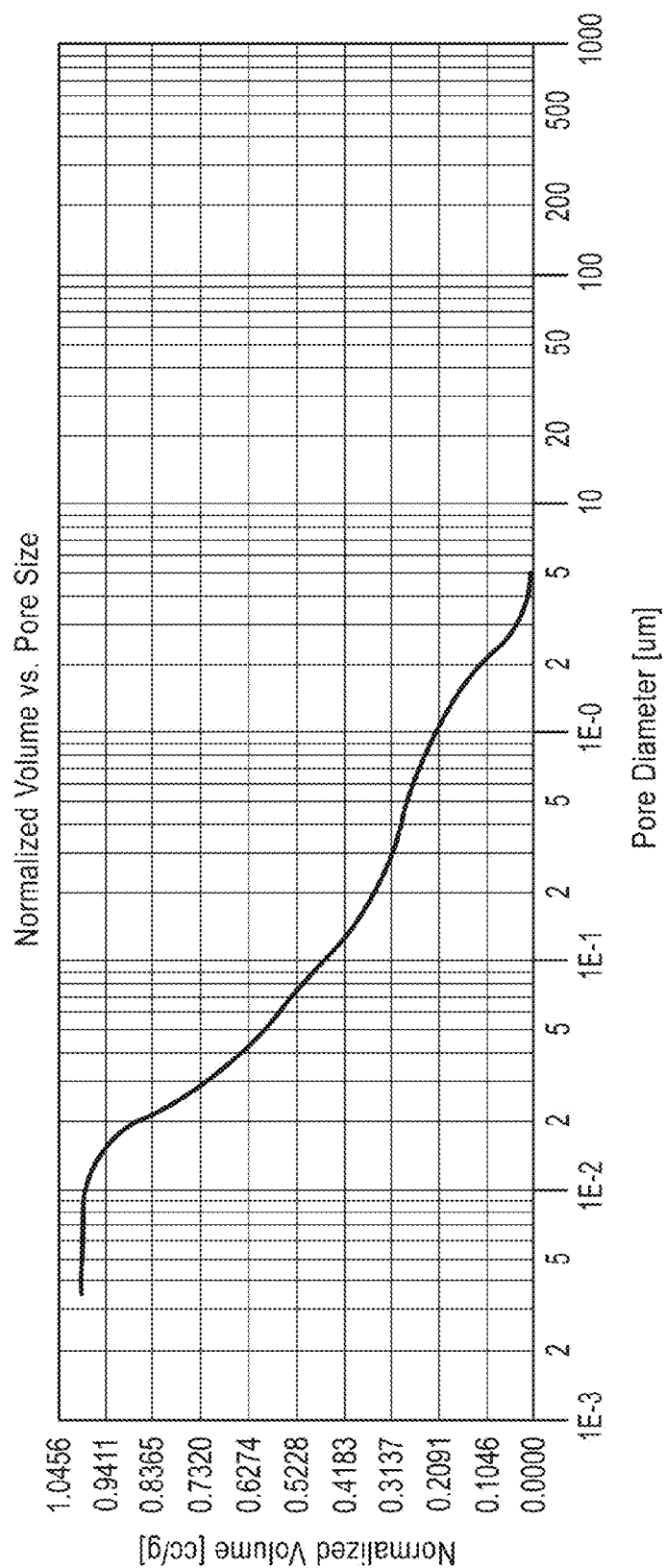
FIG. 3 shows the measurement results of the total pore volume of the cerium-zirconium based compound oxide obtained in Comparative Example 1 (Fresh) of the present invention.
Figure 4:
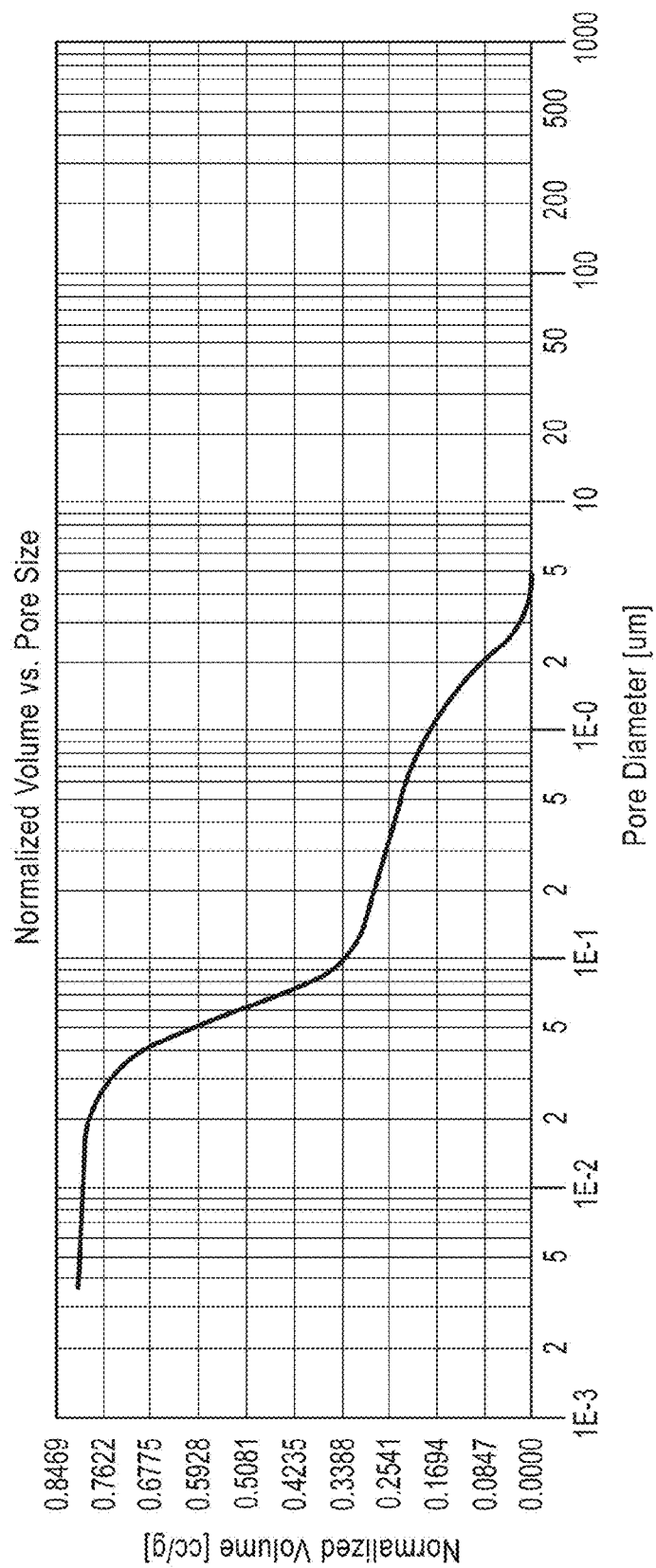
FIG. 4 shows the measurement results of the total pore volume of the cerium-zirconium based compound oxide obtained in Comparative Example 1 (after a heat treatment at 1,000° C. for 3 hours) of the present invention.

The invention claimed is:

1. A cerium-zirconium based compound oxide having a total add up pore volume of at least 0.4 ml/g, the add up volume of pores having a diameter of 10 nm to 100 nm being 0.25 ml/g or more, and the add up volume of pores having a diameter of 100 nm to 10 μm being 0.2 ml/g or less.

2. The cerium-zirconium based compound oxide according to claim 1, wherein, after a heat treatment at 1,000° C. for 3 hours, the total add up pore volume is at least 0.35 ml/g, the add up volume of pores having a diameter of 10 nm to 100 nm is 0.2 ml/g or more, and the add up volume of pores having a diameter of 100 nm to 10 μm is 0.2 ml/g or less.

3. The cerium-zirconium based compound oxide according to claim 1, wherein the atomic ratio of cerium to zirconium is 20:80 to 80:20.

4. The cerium-zirconium based compound oxide according to claim 1, which contains 1% to 30% of oxide of at least one metal selected from the group consisting of rare-earth metals other than cerium, transition metal elements, alkaline earth metals, Al, In, Si, Sn, Bi and Zn.

5. A method for producing a cerium-zirconium based compound oxide comprising:
Step 1: adding an oxidizing agent to a cerium salt solution;
Step 2: adding a sulfatizing agent to a zirconium salt solution of 100° C. or more in an autoclave to form a basic zirconium sulfate;
Step 3: mixing an oxidizing agent-added cerium salt solution with a basic zirconium sulfate;
Step 4: neutralizing the mixed solution to form a cerium-zirconium based compound hydroxide; and
Step 5: heat-treating the cerium-zirconium based compound hydroxide to form a cerium-zirconium based compound oxide.

6. The method for producing a cerium-zirconium based compound oxide according to claim 5, wherein at least one metal salt selected from the group consisting of salts of rare-earth metals other than cerium, transition metal elements, alkaline earth metals, and salts of Al, In, Si, Sn, Bi and Zn is added before neutralizing the mixed solution of the oxidizing agent-added cerium salt solution and the basic zirconium sulfate.

* * * * *